United States Patent
Wang

(10) Patent No.: US 12,083,888 B1
(45) Date of Patent: Sep. 10, 2024

(54) TRACKING ALERT SYSTEM, METHOD, AND COMPUTER PROGRAM PRODUCT THEREOF

(71) Applicant: Tommy Songfong Wang, City of Industry, CA (US)

(72) Inventor: Tommy Songfong Wang, City of Industry, CA (US)

( * ) Notice: Subject to any disclaimer, the term of this patent is extended or adjusted under 35 U.S.C. 154(b) by 73 days.

(21) Appl. No.: 18/226,452

(22) Filed: Jul. 26, 2023

(51) Int. Cl.
*B60K 35/00* (2024.01)
*B60K 35/22* (2024.01)
*B60K 35/28* (2024.01)
*G06V 20/52* (2022.01)
*G06V 20/58* (2022.01)

(52) U.S. Cl.
CPC .............. *B60K 35/00* (2013.01); *G06V 20/52* (2022.01); *G06V 20/58* (2022.01); *B60K 35/22* (2024.01); *B60K 35/28* (2024.01); *B60K 2360/176* (2024.01); *B60K 2360/178* (2024.01)

(58) Field of Classification Search
CPC .............. B60K 35/00; B60K 2370/152; B60K 2370/176; B60K 2370/178; G06V 20/52; G06V 20/58
See application file for complete search history.

(56) References Cited

U.S. PATENT DOCUMENTS

| | | | | |
|---|---|---|---|---|
| 2013/0093894 | A1* | 4/2013 | Zlotnikov | H04N 7/18 348/148 |
| 2019/0051165 | A1* | 2/2019 | Harer | G08G 1/22 |
| 2019/0236379 | A1* | 8/2019 | Golov | G05D 1/0291 |
| 2020/0011687 | A1* | 1/2020 | Lindemann | G01C 21/3469 |
| 2021/0217308 | A1* | 7/2021 | Tehrani | G08G 1/017 |
| 2022/0369066 | A1* | 11/2022 | Somanath | H04N 7/183 |
| 2022/0381566 | A1* | 12/2022 | Rashty | G06F 18/23 |
| 2023/0206708 | A1* | 6/2023 | Carter | B64D 47/08 348/155 |

* cited by examiner

Primary Examiner — Jean Paul Cass
Assistant Examiner — Alexander George Matta
(74) Attorney, Agent, or Firm — Tommy S F Wang; Wang IP Law Group, P.C.

(57) ABSTRACT

A tracking alert system for mounting on a vehicle includes a surveillance module, an odometer, an image processor, an alert processor, and a display dashboard. The image processor is electrically coupled to the surveillance module and the odometer. The alert processor is electrically coupled to the image processor. The display dashboard is electrically coupled to the alert processor. The surveillance module can capture surveillance images behind the vehicle. The odometer can determine distance data of the vehicle in motion. The image processor can identify a tracking vehicle from the surveillance images and associate the distance data of the vehicle in motion with the surveillance image of the tracking vehicle so as to generate a trip image. The alert processor can generate an alert notification based on a threshold value. The display dashboard can display the alert notification to the vehicle driver.

12 Claims, 4 Drawing Sheets

TRACKING ALERT SYSTEM, METHOD, AND COMPUTER PROGRAM PRODUCT THEREOF

FIELD OF THE INVENTION

The present invention generally relates to an alert system and method and, more particularly, to a tracking alert system and method applied to a vehicle in motion.

BACKGROUND OF THE INVENTION

Stalking cars, which follow someone's driving route to engage in annoying activities like paparazzi sneakily taking photos of celebrities or thieves committing larceny, have raised significant concerns regarding privacy and security in our modern society. Unfortunately, existing vehicle surveillance systems usually demand additional aftermarket components to be purchased and installed on the vehicle, resulting in increased effort and costs for drivers.

In particular, while conventional vehicle surveillance systems are effective at detecting the distance between two cars in the same lane to prevent tailgating collisions, they are unable to identify the stalking activities of the following cars.

SUMMARY OF THE INVENTION

In order to overcome the disadvantages associated with the aforementioned systems, a tracking alert system is disclosed. The tracking alert system for mounting on a vehicle includes a surveillance module, an odometer, an image processor, an alert processor, and a display dashboard. The image processor is electrically coupled to the surveillance module and the odometer. The alert processor is electrically coupled to the image processor. The display dashboard is electrically coupled to the alert processor. The surveillance module can capture surveillance images behind the vehicle. The odometer can determine distance data of the vehicle in motion. The image processor can identify a tracking vehicle from the surveillance images and associate the distance data of the vehicle in motion with the surveillance image of the tracking vehicle so as to generate a trip image. The alert processor can determine a tracked distance by subtracting two of the distance data of the trip images that both show the tracking vehicle, and generate an alert notification when the tracked distance exceeds a threshold value. The display dashboard can display the alert notification. The tracking alert system may be configured such that the surveillance module further includes a first camera, a second camera, and a third camera. The first camera is mounted on a left side of the vehicle. The second camera is mounted on a right side of the vehicle. The third camera is mounted on a rear side of the vehicle. The first camera can capture a first image toward a left lane, the second camera can capture a second image toward a right lane, the third camera can capture a third image toward a middle lane, and the surveillance image includes the first image, the second image, and the third image. The tracking alert system may further include a wireless transmitter electrically coupled to the alert processor. The wireless transmitter can transmit the trip image to an external device. The tracking alert system may be configured such that the alert notification further comprises the trip image showing the tracking vehicle.

In another aspect, a method for alerting a vehicle of a tracking vehicle is provided. The method includes steps of obtaining surveillance images behind the vehicle from a surveillance module, determining distance data of the vehicle in motion, identifying a tracking vehicle from the surveillance images, associating the distance data of the vehicle in motion with the surveillance image of the tracking vehicle so as to generate a trip image, determining a tracked distance by subtracting two of the distance data of the trip images that both show the tracking vehicle, generating an alert notification when the tracked distance exceeds a threshold value, and displaying the alert notification on a display dashboard. The step of obtaining the surveillance images may include steps of capturing a first image toward a left lane from a first camera on a left side of the vehicle, capturing a second image toward a right lane from a second camera on a right side of the vehicle, and capturing a third image toward a middle lane from a third camera on a rear side of the vehicle, wherein the surveillance image includes the first image, the second image, and the third image. The method may further include a step of transmitting the trip image to an external device by a wireless transmitter. The step of displaying the alert notification further may include displaying the trip image showing the tracking vehicle on the display dashboard.

In a further aspect, a computer program product can be provided. The computer program product can include a computer readable storage medium readable by a processing circuit and storing instructions for execution by a processor for performing a method. The method includes steps of obtaining surveillance images behind the vehicle from a surveillance module, determining distance data of the vehicle in motion, identifying a tracking vehicle from the surveillance images, associating the distance data of the vehicle in motion with the surveillance image of the tracking vehicle so as to generate a trip image, determining a tracked distance by subtracting two of the distance data of the trip images that both show the tracking vehicle, generating an alert notification when the tracked distance exceeds a threshold value, and displaying the alert notification on a display dashboard. The step of obtaining the surveillance images may include steps of capturing a first image toward a left lane from a first camera on a left side of the vehicle, capturing a second image toward a right lane from a second camera on a right side of the vehicle, and capturing a third image toward a middle lane from a third camera on a rear side of the vehicle, wherein the surveillance image includes the first image, the second image, and the third image. The method may further include a step of transmitting the trip image to an external device by a wireless transmitter. The step of displaying the alert notification further may include displaying the trip image showing the tracking vehicle on the display dashboard.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE
PREFERRED EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
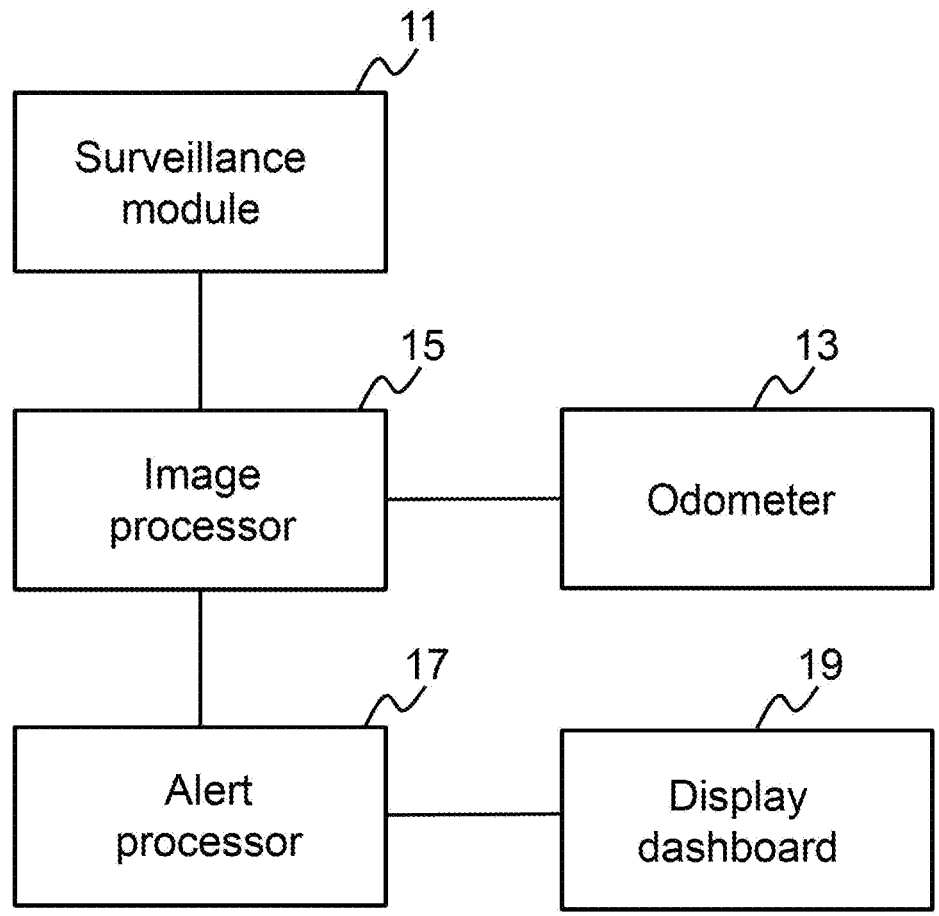
FIG. 1 shows a schematic diagram of an embodiment of a tracking alert system.
Figure 2:
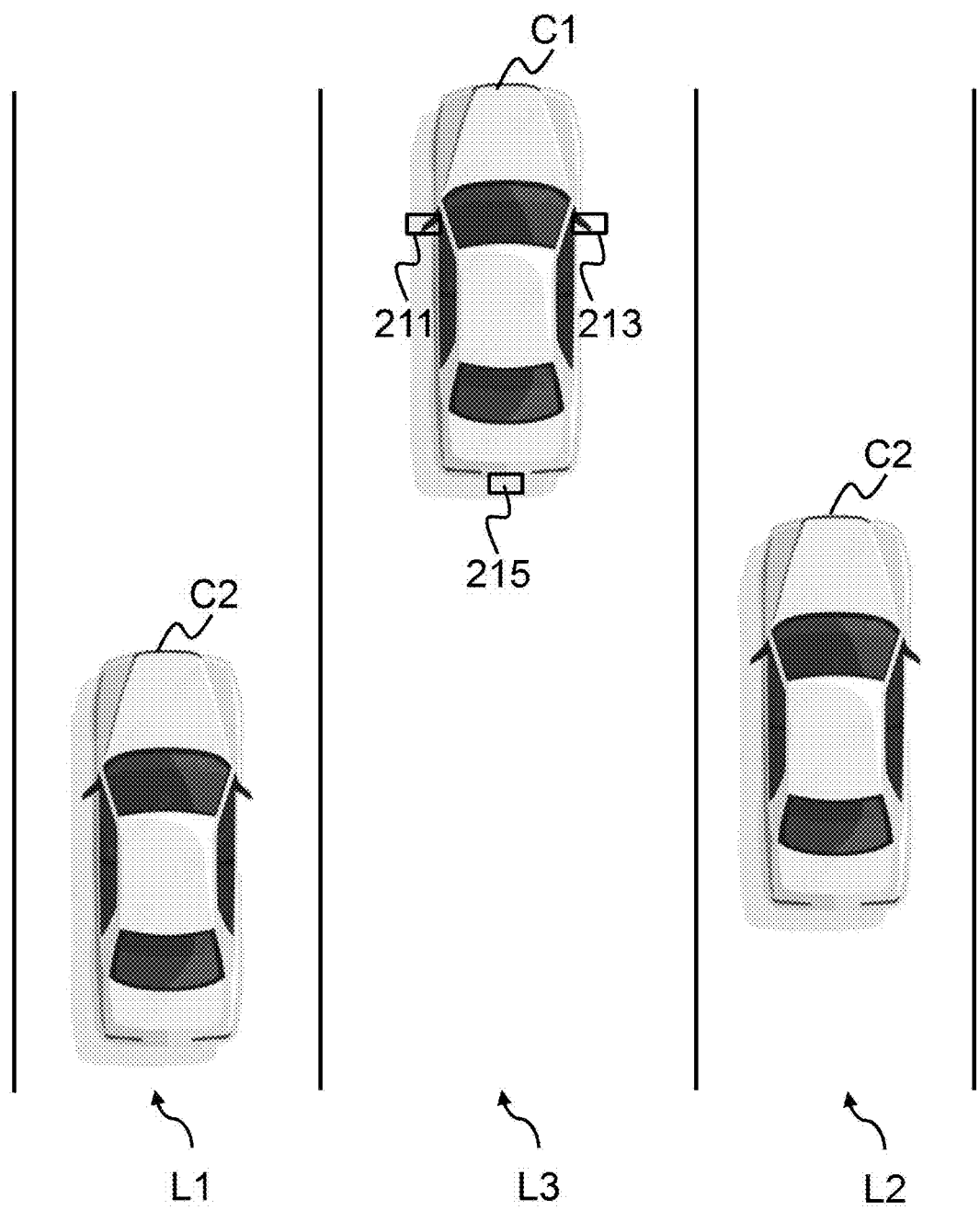
FIG. 2 shows an embodiment of a tracking alert system identifying one or more tracking vehicles.

FIG. 1 shows a schematic diagram of an embodiment of a tracking alert system. FIG. 2 shows an embodiment of a tracking alert system identifying one or more tracking vehicles. A tracking alert system can be incorporated into a vehicle during its manufacturing process. Additionally, it offers the flexibility of being installed later as an aftermarket option for vehicles that were not initially equipped with the system. The tracking alert system includes a surveillance module 11, an odometer 13, an image processor 15, an alert processor 17, and a display dashboard 19.

Referring to FIGS. 1 to 2 together, the surveillance module 11 can capture surveillance images behind the vehicle C1. It is noted that the surveillance module not only captures images of the lane where vehicle C1 is driving but also captures images of the left and right adjacent lanes. This means that the surveillance module can capture images of tracking vehicle C2 on multiple lanes, including the left lane L1, the right lane L2, and the middle lane L3.

In this embodiment, the surveillance module 11 is an automotive camera system. For example, the surveillance module 11 has various cameras strategically placed on the vehicle C1 to provide a comprehensive view of the surroundings, including but not limited to a rear-view camera, mounted at the back of the vehicle, usually near the license plate, the rear-view camera provides a view of the area behind the vehicle.

The odometer 13 can determine distance data of the vehicle C1 in motion. The odometer 13 may be a component integrated within the vehicle instrumentation or electronic control unit, designed to measure and record the distance that the vehicle C1 travels while it is in motion. It can achieve this function by monitoring the rotation of the vehicle's wheels or other relevant components, allowing it to calculate the distance traveled based on the number of wheel revolutions or through other suitable methods.

The image processor 15 is electrically coupled to the surveillance module 11 and the odometer 13. In an embodiment, the image processor 15 can be implemented by one or more of a microprocessor, a microcontroller, a digital signal processor, a microcomputer, a central processing unit, a field programmable gate array, a programmable logic device, a state machine, a logic circuit, an analog circuit, a digital circuit, and/or any processing element that operates signals based on operation instructions.

The image processor 15 can analyze the surveillance images received from the surveillance module 11. Its image processing algorithms and capabilities allow it to recognize and identify following vehicles from the surveillance images. For example, this image processing algorithms includes Optical Character Recognition algorithms (OCR). The OCR can identify the number plate of the following vehicles for further tracking analysis. The image processor 15 can further perform the functions of identifying types of following vehicles, noticing the speed of the moving vehicle and monitoring abnormal situation on the roads. In one example, the scope of following vehicles to be analyzed by the image processor 15 is restricted to three lanes close to the vehicle C1 in order to save the computing time efficiently.

Once the image processor 15 successfully identifies the tracking vehicle C2 from the surveillance images, it is able to establish a link between the surveillance image of the tracking vehicle C2 and the distance data obtained from the odometer 13. This association is beneficial for accurately correlating the position and movements of the tracking vehicle C2 with the distance traveled by the vehicle C1 during the same journey.

By combining the surveillance image of the tracking vehicle C2 with the corresponding distance data of the vehicle C1 obtained from the odometer 13, the image processor 15 can generate a trip image. This trip image is a comprehensive visual representation that overlays the captured images of the tracking vehicle C2 onto the journey taken by vehicle C1, along with corresponding distance data. Thus, the generated trip image can serve various practical purposes, including accident precaution and evidence preservation. In the event of an accident or incident involving the tracking vehicle C2 and the vehicle C1, the trip image can be used to reconstruct the sequence of events. In addition, the trip image can provide valuable evidence to support or verify the circumstances of the incident, in the case of an insurance claim.

As such, the image processor 15 can identify a tracking vehicle C2 from the surveillance images and associate the distance data of the vehicle C1 in motion with the surveillance image of the tracking vehicle C2 so as to generate a trip image.

The alert processor 17 is electrically coupled to the image processor 15. In an embodiment, alert processor 17 can be implemented by one or more of a microprocessor, a microcontroller, a digital signal processor, a microcomputer, a central processing unit, a field programmable gate array, a programmable logic device, a state machine, a logic circuit, an analog circuit, a digital circuit, and/or any processing element that operates signals based on operation instructions.

In order to ascertain whether there is any tracking activities, the alert processor 17 determines a tracked distance by performing a subtraction operation on two sets of distance data from the trip images. The alert processor 17 retrieves the distance data from two trip images that both show the tracking vehicle C2. These images are previously taken at different points in time during the journey. By subtracting the earlier distance value from the later distance value, the alert processor 17 calculates the tracked distance.

If the calculated tracked distance between the vehicle C1 and the tracking vehicle C2 exceeds a pre-determined threshold value, it indicates that the tracking vehicle is likely to stalk the vehicle C1.

When the tracked distance surpasses the threshold value, the alert processor 17 triggers an alert notification. This alert can take various forms, such as visual warnings on the display dashboard 19, audible alerts, or even alerts sent to external monitoring/security systems.

As such, the alert processor 17 can determine a tracked distance by subtracting two of the distance data of the trip images that both show the tracking vehicle C2, and generate an alert notification when the tracked distance exceeds a threshold value.

In one embodiment, the threshold value is set between 2 to 15 miles. In another embodiment, the threshold value can be adaptively determined by the specific behavior of the vehicle C1. It can be adjusted or varied based on the times of the vehicle C1 changing lanes. For example, the alert processor 17 can detect the occurrence times of the left turn signals and right turn signals from the vehicle C1. IF the driver of the vehicle C1 see suspected vehicles and change lanes 10 times in merely 1 mile, then the threshold value will be set as 1 mile. Accordingly, the alert processor 17 can identify and continuously monitor the following vehicles within a 1-mile range to determine if the tracking vehicle C2 still appears in the surveillance images. If detected, the system can proceed with the further transmission of alert notifications.

The display dashboard 19 is electrically coupled to the alert processor 17. Thus, the display dashboard 19 can receive and display the alert notification to the driver. The alert is displayed on the car's dashboard, providing timely information to the driver about the presence of a potential tailgating or stalking vehicle. For example, the alert notification further includes the trip image showing the tracking vehicle.

Especially, when the driver switch to automatic driving mode, they may not be aware of the following vehicle C2 that has kept stalking the vehicle C1 over predetermined distance. Therefore, the driver may choose to switch back to manual driving mode and alter the route to safeguard their privacy and security.

In one embodiment, the surveillance module 11 further includes a first camera 211, a second camera 213, and a third camera 215. The first camera 211 is mounted on a left side of the vehicle C1. The second camera 213 is mounted on a right side of the vehicle C1. The third camera 215 is mounted on a rear side of the vehicle C1.

The first camera 211 can capture a first image toward a left lane L1. The second camera 213 can capture a second image toward a right lane L2. The third camera 215 can capture a third image toward a middle lane L3, i.e., where the vehicle C1 is moving on. Thus, the surveillance image can consist of the first image, the second image, and the third image.

Figure 3:
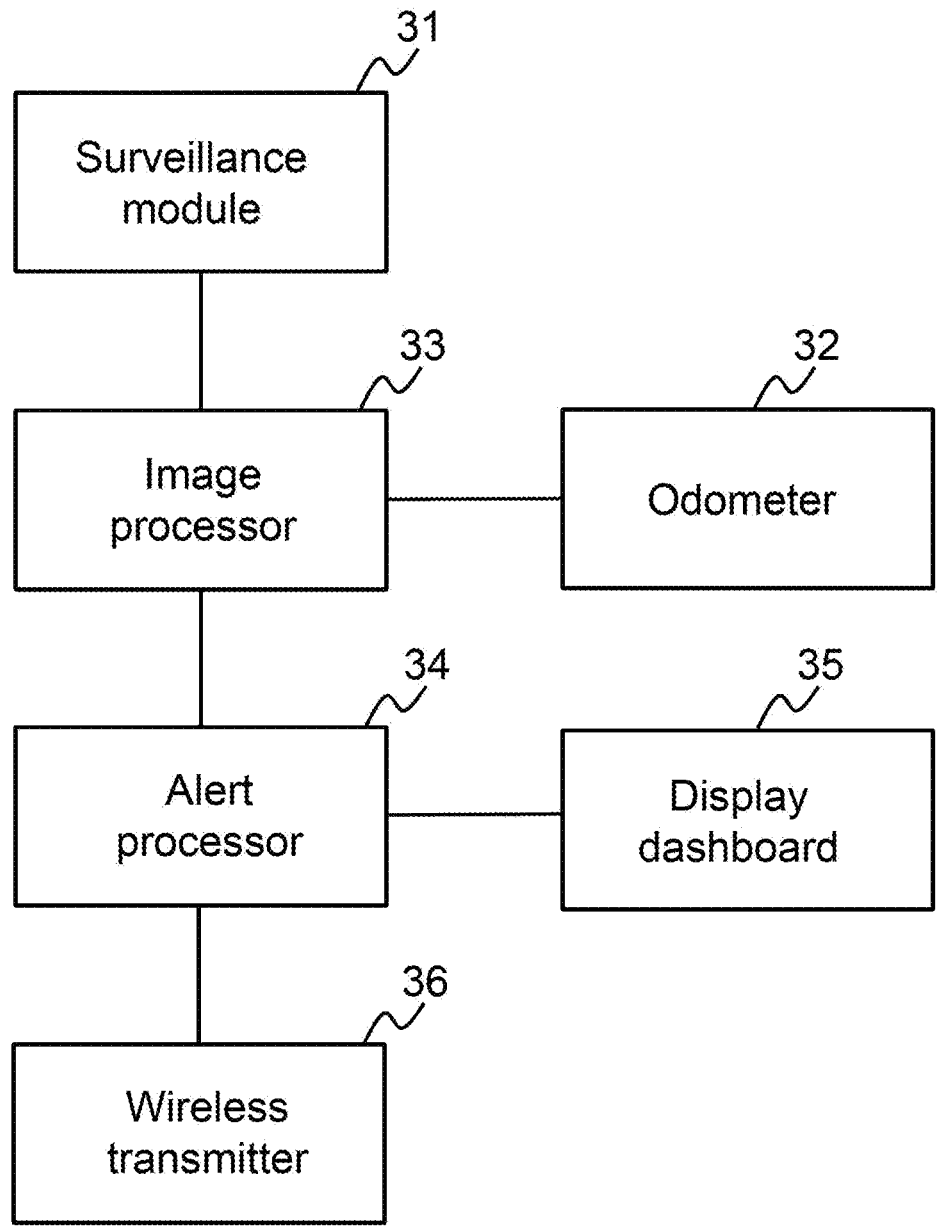
FIG. 3 shows a schematic diagram of another embodiment of a tracking alert system.

FIG. 3 shows a schematic diagram of another embodiment of a tracking alert system. The tracking alert system includes a surveillance module 31, an odometer 32, an image processor 33, an alert processor 34, a display dashboard 35, and a wireless transmitter 36. The structure, function, advantages, and connections among the surveillance module 31, the odometer 32, the image processor 33, the alert processor 34, and the display dashboard 35 are substantially similar to the aforementioned embodiments. In addition, the wireless transmitter 36 is electrically coupled to the alert processor 34. The wireless transmitter 36 can transmit the trip image to an external device. The external device may be but not limited to the driver's smartphone or remote security system.

As such, when the pre-determined threshold value is met, the system triggers alerts to the driver and further preserves evidence of the suspected following vehicle for transmission to authorities like insurance companies or police office.

Figure 4:
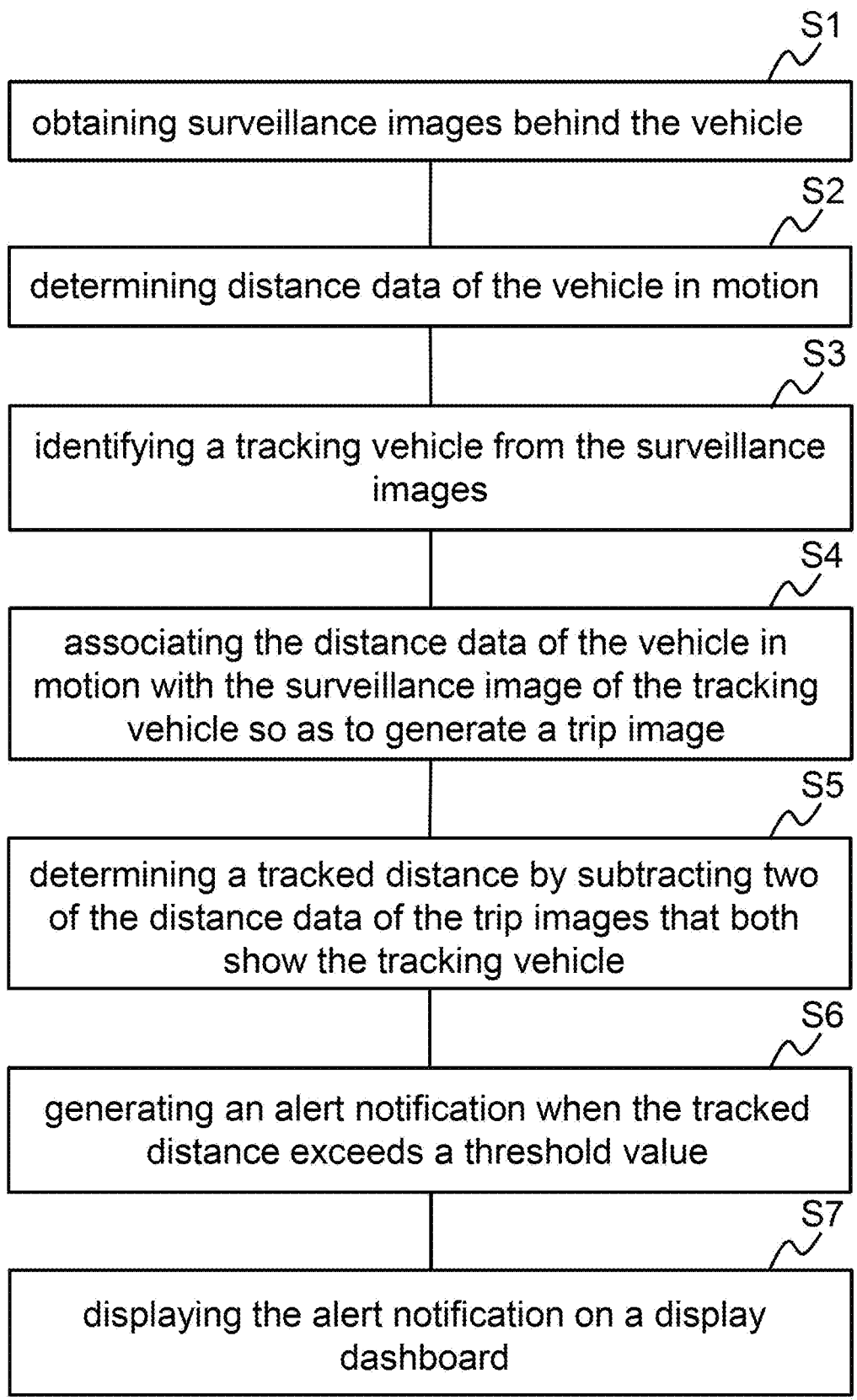
FIG. 4 shows a flowchart of an embodiment of a method for alerting a vehicle of a tracking vehicle.

FIG. 4 shows a flowchart of an embodiment of a method for alerting a vehicle of a tracking vehicle. Referring to FIGS. 1, 2 and 4 together, the method for alerting a vehicle of a tracking vehicle includes:

step S1: obtaining surveillance images behind the vehicle C1 from a surveillance module 11;

step S2: determining distance data of the vehicle C1 in motion;

step S3: identifying a tracking vehicle C2 from the surveillance images;

step S4: associating the distance data of the vehicle C1 in motion with the surveillance image of the tracking vehicle C2 so as to generate a trip image;

step S5: determining a tracked distance by subtracting two of the distance data of the trip images that both show the tracking vehicle C2;

step S6: generating an alert notification when the tracked distance exceeds a threshold value; and step S7: displaying the alert notification on a display dashboard 19.

In one embodiment, the step S1 of obtaining the surveillance images may include steps of capturing a first image toward a left lane L1 from a first camera 211 on a left side of the vehicle C1, capturing a second image toward a right lane L2 from a second camera 213 on a right side of the vehicle C1, and capturing a third image toward a middle lane L3 from a third camera 215 on a rear side of the vehicle C1, wherein the surveillance image includes the first image, the second image, and the third image.

In one embodiment, the method may further include a step of transmitting the trip image to an external device by a wireless transmitter.

In one embodiment, the step of displaying the alert notification further may include displaying the trip image showing the tracking vehicle on the display dashboard.

The aforementioned steps of the methods can be implemented through one or more embodiments of the tracking alert systems mentioned above, thus avoiding redundant repetition of the technical function, results, and advantages.

In another embodiment, a computer program product can be provided. The computer program product can include a computer readable storage medium readable by a processing circuit and storing instructions for execution by a processor for performing one or more embodiments of the methods for alerting a vehicle of a tracking vehicle mentioned above. Thus, the technical function, results, and advantages are omitted here to avoid redundant repetition. In one embodiment, the computer program product is an application software that can be downloaded from the internet or other wireless networks. This allows modern vehicles to upgrade their software program to implement the method of alerting the driver of a tracking vehicle without the cost of hardware modification or installation.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

The terms and expressions used herein have the ordinary meaning accorded to such terms and expressions in their respective areas, except where specific meanings have been set forth. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. A tracking alert system incorporated into a vehicle comprising:
 a surveillance module for capturing surveillance images behind the vehicle;
 an odometer for determining distance data of the vehicle when in motion;
 an image processor electrically coupled to the surveillance module and the odometer, wherein the image processor can identify a tracking vehicle from the surveillance images and associate the distance data of the vehicle when in motion with the surveillance images that included the tracking vehicle so as to generate trip images;
 an alert processor electrically coupled to the image processor, where the alert processor can determine a tracked distance by subtracting two values of the distance data of the trip images that both show the tracking vehicle, and generate an alert notification when the tracked distance exceeds a threshold value, wherein the threshold value can be adaptively determined by occurrence times of the vehicle changing lanes; and
 a display dashboard electrically coupled to the alert processor, wherein the display dashboard can display the alert notification.

2. The tracking alert system of claim 1, wherein the surveillance module comprises:
 a first camera on a left side of the vehicle;
 a second camera on a right side of the vehicle; and
 a third camera on a rear side of the vehicle;
 wherein the first camera can capture a first image toward a left lane, the second camera can capture a second image toward a right lane, the third camera can capture a third image toward a middle lane, and the surveillance image includes the first image, the second image, and the third image.

3. The tracking alert system of claim 1, further comprising:
 a wireless transmitter electrically coupled to the alert processor, wherein the wireless transmitter can transmit the trip images to an external device.

4. The tracking alert system of claim 1, wherein the alert notification further comprises the trip images showing the tracking vehicle.

5. A method for alerting a vehicle of a tracking vehicle comprising:
 obtaining surveillance images behind the vehicle from a surveillance module incorporated into the vehicle;
 determining distance data of the vehicle when in motion by an odometer incorporated into the vehicle;
 identifying a tracking vehicle from the surveillance images;
 associating the distance data of the vehicle when in motion with the surveillance images that included the tracking vehicle so as to generate trip images;
 determining a tracked distance by subtracting two values of the distance data of the trip images that both show the tracking vehicle;
 generating an alert notification when the tracked distance exceeds a threshold value, wherein the threshold value can be adaptively determined by occurrence times of the vehicle changing lanes; and
 displaying the alert notification on a display dashboard.

6. The method of claim 5, wherein the obtaining the surveillance images comprising:
 capturing a first image toward a left lane from a first camera on a left side of the vehicle;
 capturing a second image toward a right lane from a second camera on a right side of the vehicle; and
 capturing a third image toward a middle lane from a third camera on a rear side of the vehicle; wherein the surveillance image includes the first image, the second image, and the third image.

7. The method of claim 5, further comprising:
 transmitting the trip images to an external device by a wireless transmitter.

8. The method of claim 5, wherein the displaying the alert notification further comprises: displaying the trip images showing the tracking vehicle on the display dashboard.

9. A computer program product comprising:
 a non-transitory computer readable storage medium readable by a processing circuit and storing instructions for execution by a processor for performing a method comprising:
  obtaining surveillance images behind a vehicle from a surveillance module incorporated into the vehicle;
  determining distance data of the vehicle when in motion by an odometer incorporated into the vehicle;
  identifying a tracking vehicle from the surveillance images;
  associating the distance data of the vehicle when in motion with the surveillance images that included the tracking vehicle so as to generate trip images;
  determining a tracked distance by subtracting two values of the distance data of the trip images that both show the tracking vehicle;
  generating an alert notification when the tracked distance exceeds a threshold value, wherein the threshold value can be adaptively determined by occurrence times of the vehicle changing lanes; and
  displaying the alert notification on a display dashboard.

10. The computer program product of claim 9, wherein the obtaining the surveillance images comprising:
 capturing a first image toward a left lane from a first camera on a left side of the vehicle;
 capturing a second image toward a right lane from a second camera on a right side of the vehicle; and
 capturing a third image toward a middle lane from a third camera on a rear side of the vehicle; wherein the surveillance image includes the first image, the second image, and the third image.

11. The computer program product of claim 9, wherein the method further comprises:
 transmitting the trip images to an external device by a wireless transmitter.

12. The computer program product of claim 9, wherein the displaying the alert notification further comprises: displaying the trip images showing the tracking vehicle on the display dashboard.

* * * * *